United States Patent
Ho

(10) Patent No.: US 7,568,848 B2
(45) Date of Patent: Aug. 4, 2009

(54) MAGNETIC SLIDING DOOR STRUCTURE

(75) Inventor: Chin Hsin Ho, Hsinchu (TW)

(73) Assignee: Altek Corporation, Hsinchu (TW)

( * ) Notice: Subject to any disclaimer, the term of this patent is extended or adjusted under 35 U.S.C. 154(b) by 643 days.

(21) Appl. No.: 11/412,806

(22) Filed: Apr. 28, 2006

(65) Prior Publication Data

US 2007/0253705 A1 Nov. 1, 2007

(51) Int. Cl.
*G03B 17/00* (2006.01)

(52) U.S. Cl. .................. 396/448; 359/507; 359/511

(58) Field of Classification Search .......... 396/439, 396/448, 301; 359/507, 511
See application file for complete search history.

(56) References Cited

U.S. PATENT DOCUMENTS

2003/0147637 A1* 8/2003 Sasagawa .............. 396/88
2006/0056838 A1* 3/2006 Chen .................... 396/448
2006/0208576 A1* 9/2006 Tseng et al. ............. 307/113

* cited by examiner

*Primary Examiner*—W. B. Perkey
*Assistant Examiner*—Warren K Fenwick
(74) *Attorney, Agent, or Firm*—Rosenberg, Klein & Lee

(57) ABSTRACT

A magnetic sliding door structure comprises a first and a second magnetic elements attracting each other and disposed on a shell body of a camera and a sliding door, a linkage member disposed below the sliding door, and a third magnetic element disposed at two ends of the linkage member. The third magnetic element repels from the first and second magnetic elements. When one end of the linkage member tilts, the third magnetic element at the other end will enter between the first magnetic element and the second magnetic element to make the sliding door slide toward one side through the repulsive forces between them. This sliding door structure functions based on the physical properties of magnet to avoid complicated gear and rack structures and lower the manufacturing difficulty and cost. Moreover, electric power consumption in the prior art can be saved to increase the standby time of camera.

11 Claims, 5 Drawing Sheets

MAGNETIC SLIDING DOOR STRUCTURE

BACKGROUND OF THE INVENTION

1. Field of the Invention

The present invention relates to a sliding door structure and, more particularly, to a magnetic sliding door structure of convenient operation and no electric power consumption.

2. Description of Related Art

Most digital cameras used today have a lens protection cover, which provides the protection and dust-free function for the photographing lens. When the lens protection cover covers the photographing lens, the photographing lens will retract into the camera body, and the camera enters the off mode. Before taking pictures, the user first has to turn on the camera to make the lens protection cover leave from the position where it covers the photographing lens, and the camera immediately enters the on mode. Afterwards, the user can start to take pictures.

U.S. Pat. No. 5,819,127 discloses "a lens cover that slides along front surface of a camera body." As shown in FIG. 1, two guide grooves 12 are disposed on a camera 10. A sliding cover 14 is fastened on the camera 10 through the guide grooves 12. The sliding cover 14 can slide in the guide grooves 12 to make a photographing lens 16 protrude out of or retract into the body of the camera 10. For the operation of the protection cover structure, the user has to directly pull (push) the sliding cover to allow the sliding cover slide to a fixed position, hence resulting in inconvenient operation of the user. Although some manufacturers have modified the sliding action of this sliding cover to automatic motion by using a plurality of gears or racks that are linked mutually to open or close the protection cover, the speed of opening or closing the protection cover is slow, and the high complexity in assembly of these gears or racks causes much trouble in manufacturing. Moreover, because a motor is required to drive these gears or racks, there is a certain degree of electric power consumption to make the camera unable to maintain standby for a long time.

The present invention aims to propose a magnetic sliding door structure to solve the above problems in the prior art.

SUMMARY OF THE INVENTION

An object of the present invention is to provide a magnetic sliding door structure, in which the physical properties of magnet that like poles repel and unlike poles attract is based to make the sliding door slide, thereby avoiding the complicated gear and rack structure in the prior art and greatly lower the manufacturing difficulty and cost.

Another object of the present invention is to provide a magnetic sliding structure, in which the sliding structure is actuated based on the physical properties of magnet to avoid the electric power consumption in the prior art, thereby increasing the standby time of a camera.

Yet another object of the present invention is to provide a magnetic sliding structure, in which the physical properties of magnet and the design of sliding track are based on to make the sliding door structure able to automatically and quickly slide, thereby facilitating the operation of user.

According to the present invention, a magnetic sliding door structure comprises a sliding door, two first magnetic elements and two second magnetic elements, and a linkage member. The sliding door is disposed on the surface of a shell body and capable of sliding on the surface of the shell body. The two first magnetic elements are disposed on two sides of the sliding door. Each second magnetic element corresponds to one first magnetic element and is disposed on the shell body. A gap is formed between each second magnetic element and each first magnetic element. The polarities of the two first magnetic elements and the two second magnetic elements are in the same direction to attract each other. The linkage member is disposed on the shell body. At least a third magnetic element is disposed at each of two sides of the linkage member. The polarity of the third magnetic elements is opposite to those of the two first magnetic elements and the two second magnetic elements. When one end of the linkage member tilts, the third magnetic component at the other end of the linkage member will enter the gap to make the sliding door slide toward one side through the repulsive forces between the third magnetic element and the first and second magnetic elements.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

In order to get rid of the drawbacks of complicated structure, large electric power consumption and slow opening and closing speed in the prior art, the present invention proposes a magnetic sliding door structure that bases on the physical properties of magnet that like poles repel and unlike poles attract to make a sliding door able to open and close quickly and greatly lower the electric power consumption.

Figure 1:
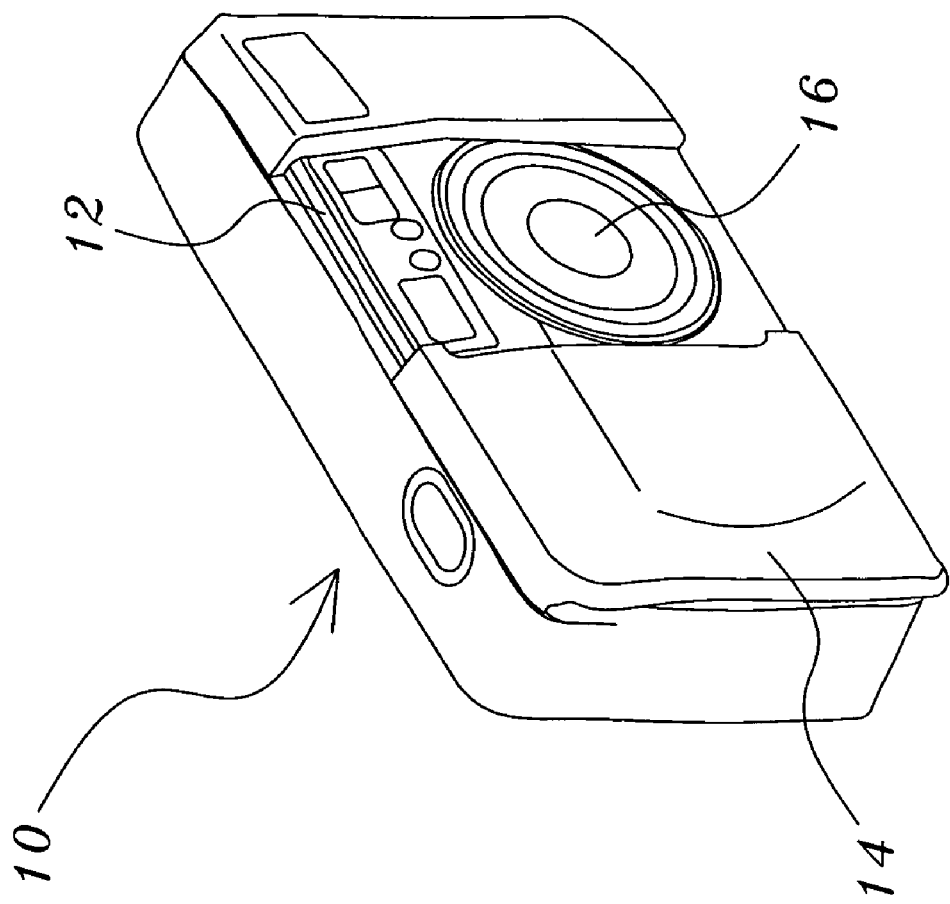
FIG. 1 is a perspective view of a protection cover of a prior art camera.
Figure 2:
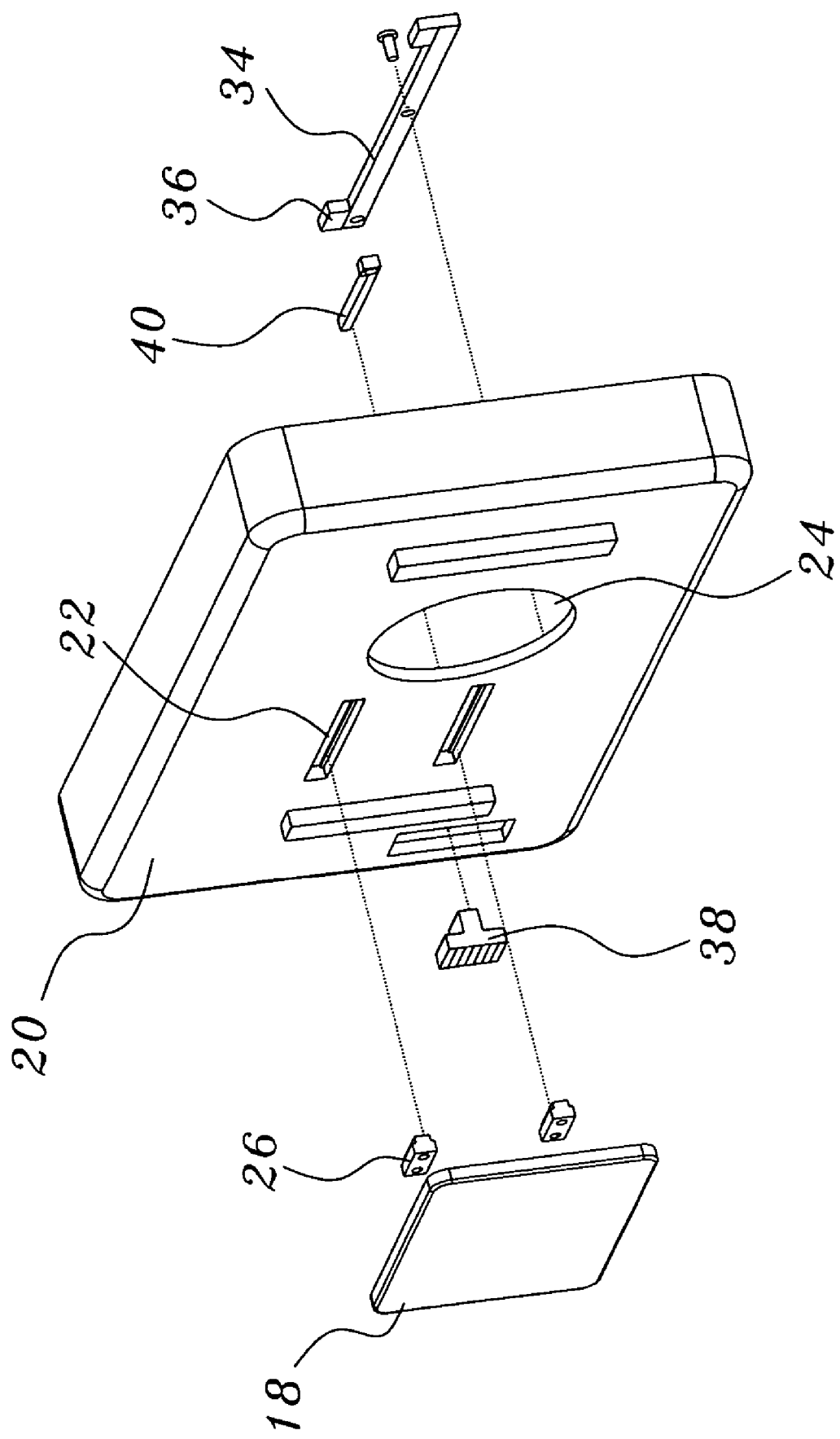
FIG. 2 is an exploded perspective view of the present invention.
Figure 3:
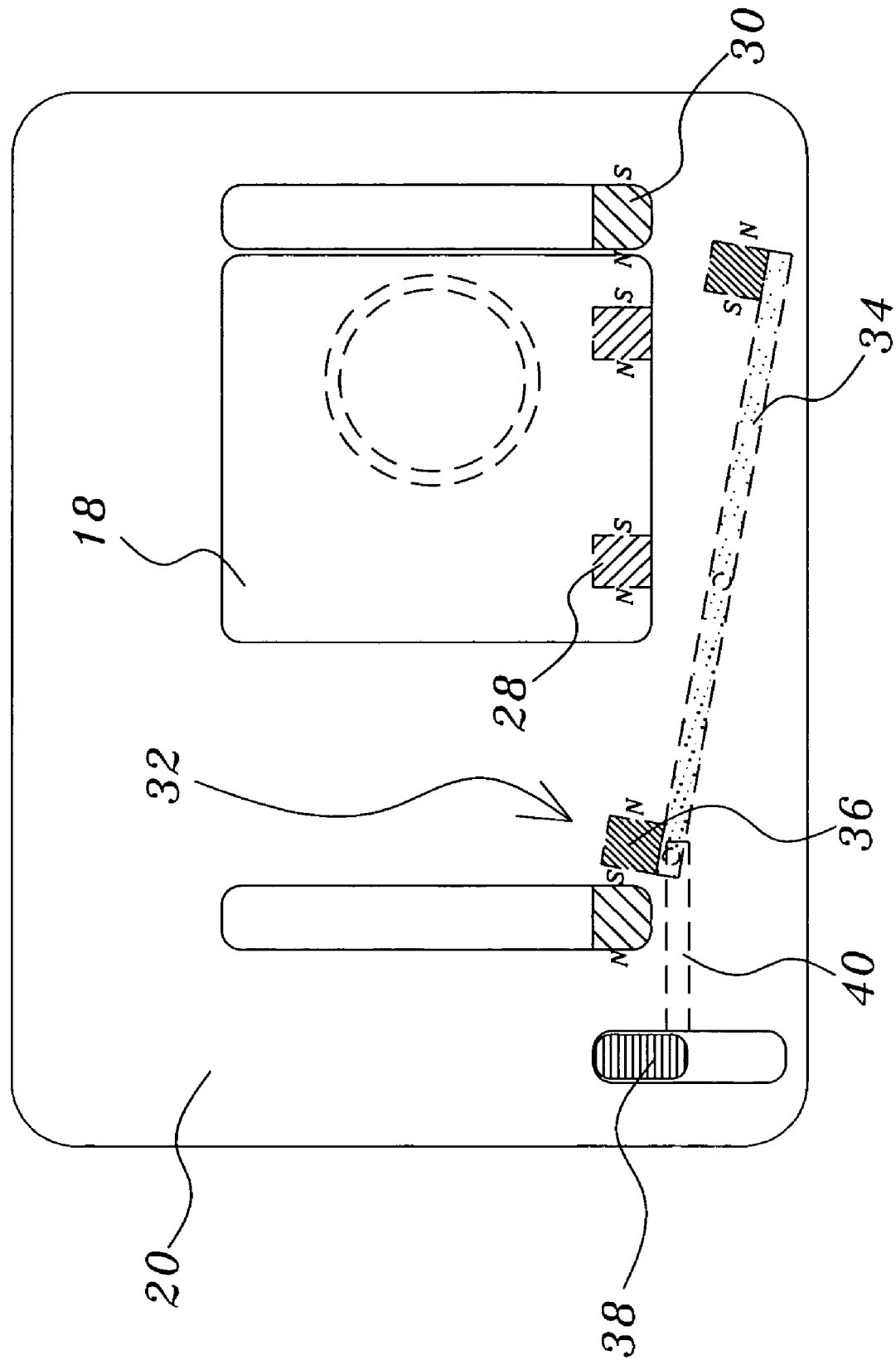
FIG. 3 is a diagram of the present invention when the sliding door is closed.

As shown in FIGS. 2 and 3, a magnetic sliding door structure is disposed on a photographing device. This photographing device can be a mobile phone, a digital still camera or a digital camcorder. In this embodiment, the photographing device is a digital still camera. The sliding door structure comprises a sliding door 18, which is disposed on the surface of a shell body 20. Two through-hole shaped sliding tracks 22 and an opening 24 are disposed on the surface of the shell body 20. A photographing lens of a camera can be exposed out of the opening 24. Two sliding elements such as two sliding pieces 26 are disposed on the sliding door 18. The two sliding pieces 26 are disposed in the sliding tracks 22 of the shell body 20, respectively. The sliding elements can also be pulleys to lower the sliding friction. The two sliding pieces 26 are fastened in the two sliding tracks 22 of the shell body 20, respectively. A first magnetic element 28 is disposed at each of two sides of the bottom of the sliding door 18. Two second magnetic elements 30 are fixedly disposed at two outer sides of the shell body 20 and located beside the two first magnetic elements 28. The two second magnetic elements 30 and the two first magnetic elements 28 are coplanar and mutually attract. A gap 32 is formed between the second magnetic element 30 and the first magnetic element at the same side. A linkage member 34 is disposed at the inner side of the shell body 20 and below the second magnetic elements 30 and the first magnetic elements 28. The linkage member 34 can be a lever. A third magnetic element 36 is disposed at each of two ends of the linkage member 34. The third magnetic elements 36 and the first and second magnetic elements 28 and 30 mutually repel. The third magnetic elements 36 are located below the gaps 32.

Figure 4:
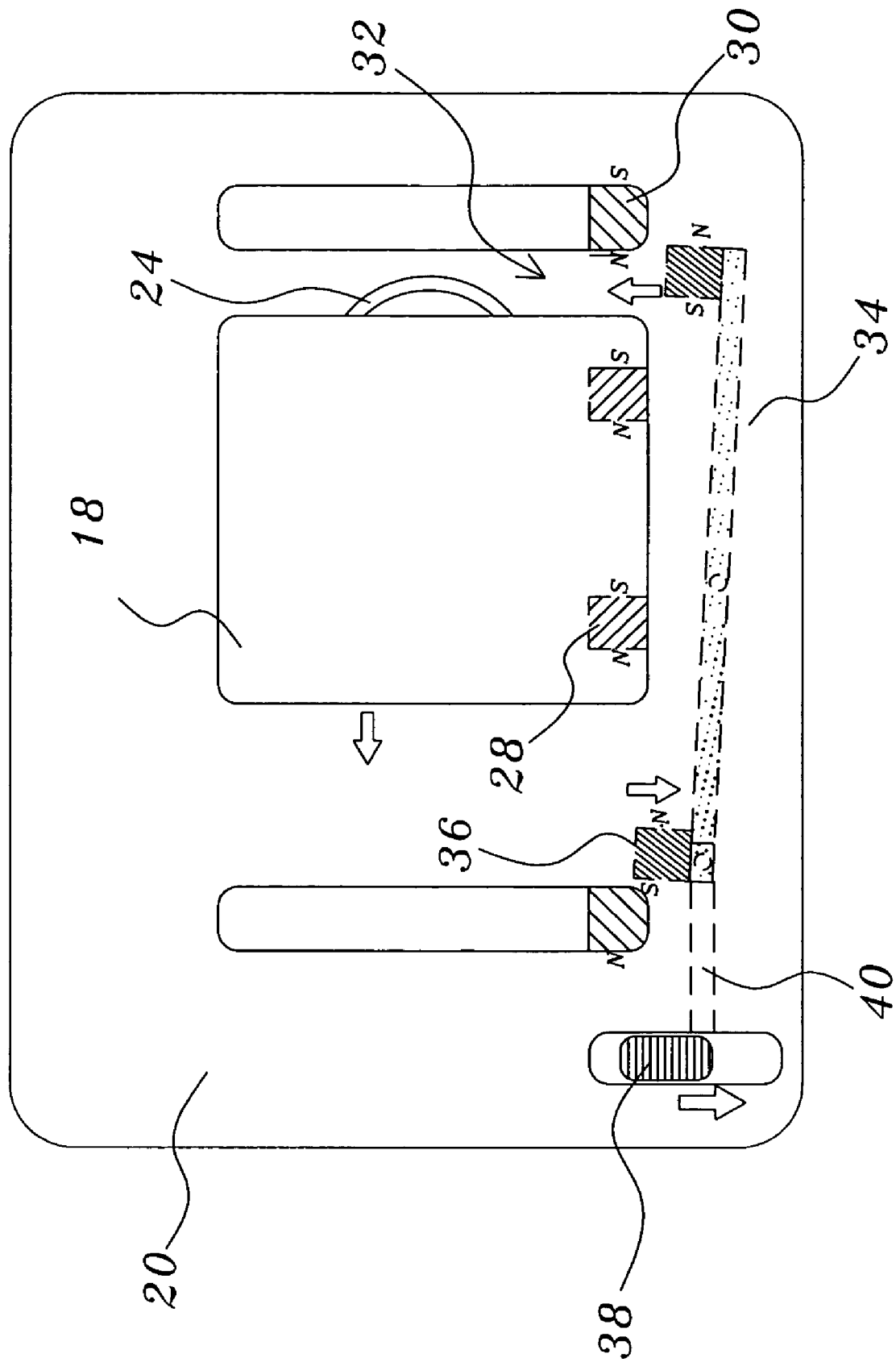
FIG. 4 is a diagram of the present invention when the sliding door is to be opened.
Figure 5:
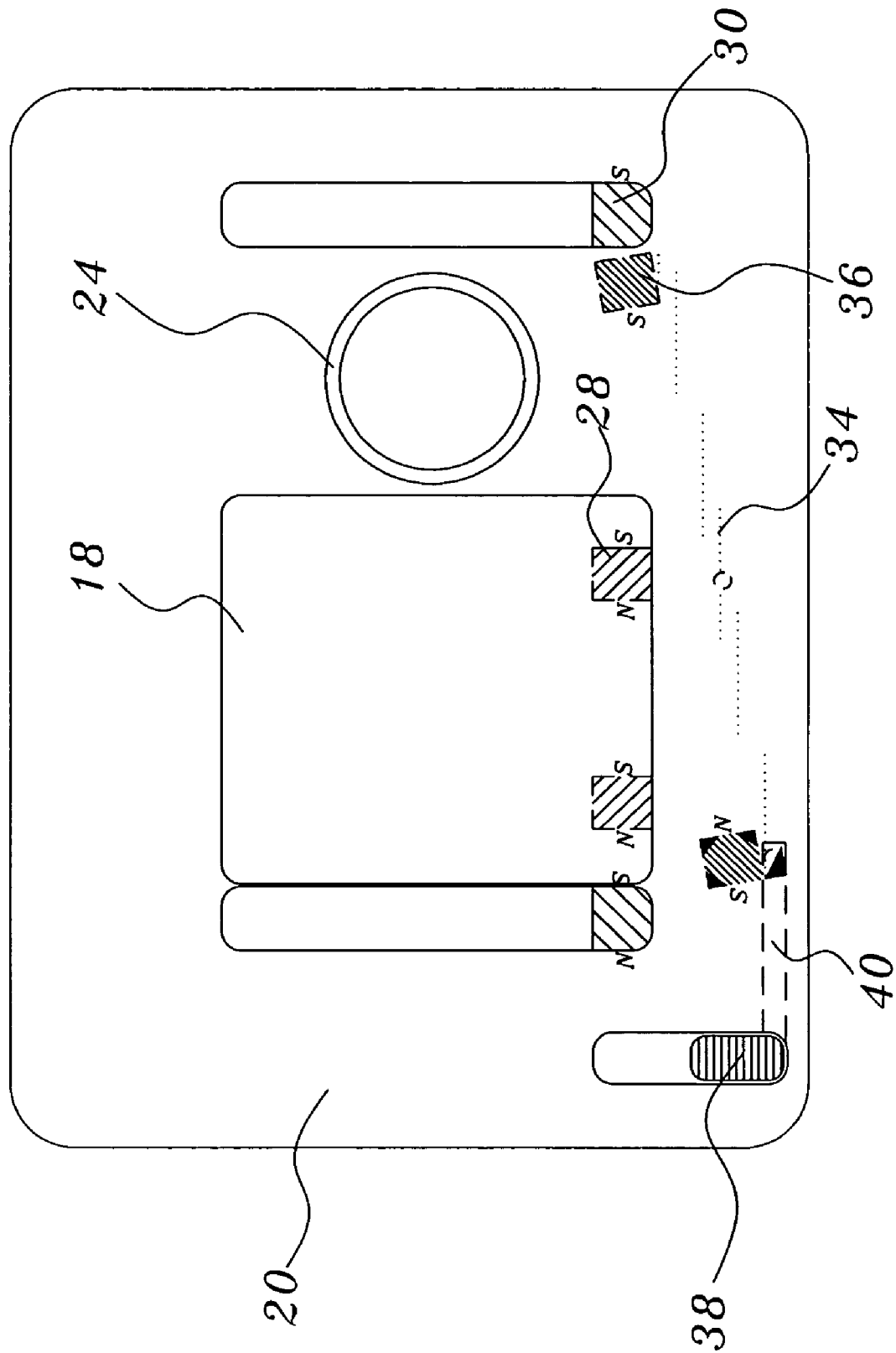
FIG. 5 is a diagram of the present invention when the sliding door is opened.

As shown in FIGS. 4 and 5, when one end of the linkage member 34 tilts, the third magnetic element 36 at this end of the linkage member 34 will enter the gap 32 to make the sliding door 18 slide toward one side by means of the characteristic of magnet that like poles repel each other, thereby exposing or shutting the photographing lens in the opening 24. A switch element 38 is further disposed on the shell body 20. The switch element 38 is connected to one end of the linkage member 34 via a connection element such as a link 40. The switch element 38 is switched on or off to tilt the link 40 so as to control the opening or closing action of the sliding door 18.

To sum up, a plurality of magnetic elements is disposed on a sliding door in the present invention, and the physical properties of magnet that like poles repel and dislike poles attract is based on to make the sliding door slide, thereby getting rid of the complicated gear and rack structure and greatly lower the manufacturing difficulty and cost. Moreover, using the physical properties of magnet to actuate the sliding door structure can avoid the electric power consumption in the prior art to increase the standby time of a camera. In addition to utilizing the physical properties of magnet, the present invention also exploits the design of sliding track with lower friction to make the sliding door structure able to automatically and quickly slide, thereby facilitating the operation of user.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A magnetic sliding door structure comprising:
    a sliding door disposed on a surface of a shell body and capable of sliding on the surface of said shell body;
    two first magnetic elements and two second magnetic elements, said two first magnetic elements being disposed on two sides of said sliding door, each said second magnetic element corresponding to one of said two first magnetic elements and being disposed on said shell body, a gap being formed between each said second magnetic element and each said first magnetic element, the polarity of said two first magnetic elements and said two second magnetic elements being in the same direction to attract each other; and
    a linkage member disposed on said shell body, at least a third magnetic element being disposed at each of two sides of said linkage member, the polarity of said third magnetic elements being opposite to those of said two first magnetic elements and said two second magnetic elements;
    whereby when one end of said linkage member tilts, said third magnetic component at the other end of said linkage member will enter said gap to make said sliding door slide toward one side through the repulsive forces between said third magnetic element and said first and second magnetic elements.

2. The magnetic sliding door structure as claimed in claim 1, wherein a switch element is further disposed on said shell body to control the tilt action of said linkage member.

3. The magnetic sliding door structure as claimed in claim 2, wherein said switch element is connected to said linkage member via at least a connection element to allow said switch element to control the action of said linkage member.

4. The magnetic sliding door structure as claimed in claim 3, wherein said connection element is a link.

5. The magnetic sliding door structure as claimed in claim 1, wherein said linkage member is a lever.

6. The magnetic sliding door structure as claimed in claim 1, wherein at least a sliding track is disposed on said shell body for installation of said sliding door.

7. The magnetic sliding door structure as claimed in claim 6, wherein said sliding door is installed in said sliding track by using a plurality of sliding elements and slides in said sliding track.

8. The magnetic sliding door structure as claimed in claim 7, wherein said sliding elements are pulleys or sliding pieces.

9. The magnetic sliding door structure as claimed in claim 1, wherein said sliding door structure is disposed on a photographing device.

10. The magnetic sliding door structure as claimed in claim 9, wherein said photographing device is a mobile phone, a digital still camera or a digital camcorder.

11. The magnetic sliding door structure as claimed in claim 9, wherein an opening is disposed on said shell body to expose a photographing lens of said photographing device, and said opening can be covered by said sliding door.

\* \* \* \* \*